US009644636B2

(12) United States Patent
Hashimoto et al.

(10) Patent No.: US 9,644,636 B2
(45) Date of Patent: May 9, 2017

(54) CENTRIFUGAL STEAM COMPRESSOR AND SHAFT SEAL SYSTEM USED WITH SAME

(71) Applicant: Hitachi, Ltd., Tokyo (JP)

(72) Inventors: Taiji Hashimoto, Tokyo (JP); Tao Hu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 14/377,329

(22) PCT Filed: Mar. 1, 2013

(86) PCT No.: PCT/JP2013/055754
§ 371 (c)(1),
(2) Date: Aug. 7, 2014

(87) PCT Pub. No.: WO2013/129675
PCT Pub. Date: Sep. 6, 2013

(65) Prior Publication Data
US 2015/0330401 A1 Nov. 19, 2015

(30) Foreign Application Priority Data

Mar. 2, 2012 (JP) ................................ 2012-046165

(51) Int. Cl.
*F04D 29/10* (2006.01)
*F04D 29/12* (2006.01)
(Continued)

(52) U.S. Cl.
CPC .............. *F04D 29/124* (2013.01); *F01K 5/02* (2013.01); *F04D 17/10* (2013.01); *F16J 15/3404* (2013.01)

(58) Field of Classification Search
CPC ...... F04D 29/10; F04D 29/102; F04D 29/104; F04D 29/12; F04D 29/122; F04D 29/124;
(Continued)

(56) References Cited

U.S. PATENT DOCUMENTS 3,539,270 A 11/1970 Derrickson
6,607,348 B2 * 8/2003 Jean ...................... F04D 29/122
277/408

FOREIGN PATENT DOCUMENTS

DE 41 17 610 C1 7/1992
JP 60-111094 A 6/1985
(Continued)

OTHER PUBLICATIONS

Extended European Search Report received in corresponding European Application No. 13755175.0 dated Oct. 27, 2015.

*Primary Examiner* — Richard Edgar
(74) *Attorney, Agent, or Firm* — Mattingly & Malur, PC

(57) ABSTRACT

In a centrifugal steam compressor having sealing water discharge at pressure higher than atmospheric pressure, a simple structure in which a high-pressure piping system is omitted as much as possible from a sealing water circulation system is realized. A shaft seal system 50 is capable of supplying high-pressure sealing water and low-pressure sealing water. The shaft seal system has a circulating water reservoir 240 to store circulating water, a positive displacement pump 200 to suck the circulating water from the reservoir, and is capable of supplying the sealing water to a first pressure regulating valve 290 provided in a high-pressure side sealing water line 330 of a centrifugal compressor 100 and a second pressure regulating valve 300 provided in a low-pressure side sealing water line 310 of the centrifugal compressor, an accumulator 210 provided between the positive displacement pump and the first and second pressure regulating valves, return pipings 315, 316, 335 and 336 to return the sealing water, which water-seals seal means of the centrifugal compressor, to the circulating water reservoir, and depressurization means 313, 314, 333 and 334 interpositioned in the middle of the return pipings.

6 Claims, 3 Drawing Sheets

(51) Int. Cl.
*F16J 15/34* (2006.01)
*F04D 17/10* (2006.01)
*F01K 5/02* (2006.01)

(58) Field of Classification Search
CPC .... F04D 29/106; F04D 29/108; F04D 29/126;
F04D 29/128; F04D 17/10; F01K 5/02;
F16J 15/3404; F16J 15/006
USPC .......................... 416/174; 415/110, 111, 112
See application file for complete search history.

(56) References Cited

FOREIGN PATENT DOCUMENTS

| JP | 60-245876 A | 12/1985 |
|----|-------------|---------|
| JP | 61-112869 A | 5/1986 |
| JP | 61-178098 A | 8/1986 |
| JP | 62-288777 A | 12/1987 |
| JP | 2-54972 A | 2/1990 |
| JP | 2-103184 A | 4/1990 |
| JP | 2008-57452 A | 3/2008 |
| JP | 2010-223332 A | 10/2010 |

* cited by examiner

TEMPERATURE : SEAL CHAMBER TEMPERATURE

CENTRIFUGAL STEAM COMPRESSOR AND SHAFT SEAL SYSTEM USED WITH SAME

TECHNICAL FIELD

The present invention relates to a steam compressor and a shaft seal system used with it, and more particularly, to a centrifugal steam compressor preferable when high-temperature and high-pressure steam is handled and a shaft seal system used with it.

BACKGROUND ART

When working gas in a centrifugal compressor is steam, since high temperature gas flows through the device, it is necessary to cool seal members and lubrication members. In some cases, by utilizing the merit that the working gas is steam, a mechanical seal is used as a shaft seal means, and water is used as cooling and shaft seal liquid.

An example of this centrifugal compressor is described in Patent Literature 1.

In Patent Literature 1, to prevent occurrence of pulsation phenomenon in sealing water even under high-speed and high-pressure conditions, the shaft seal means is formed with a three-stage mechanical seal and a sealing water supply unit provided in two positions in an axial direction. Then, a sealing water supply ditch and a drain ditch, which are coaxial with a rotary axis and which are ring-shaped, are arrayed, and the sealing water is introduced and discharged via these ditches, to suppress the pulsation phenomenon of the sealing water in accordance with circular supply in seal space.

Another example of the steam compressor is described in Patent Literature 2. In the steam compressor described in this publication, a labyrinth seal is provided as a shaft seal means for shaft sealing the leakage of lubricating oil from a bearing. As purge gas for the labyrinth seal, high-pressure steam is branched from the compressor discharge side and caused to flow inside the compressor. On the other hand, the steam on the exhaust side is discharged from the shaft seal atmosphere side using a vacuum pump.

Another example of the steam compressor is described in Patent Literature 3. In the steam compressor described in this publication, water is supplied as refrigerant liquid to a vane surface of an impeller and a mechanical seal provided in a flow channel. With this arrangement, the compression work with the impeller is reduced, and the water is caused to work as sealing liquid for the mechanical seal.

CITATION LIST

Patent Literature

PTL 1: Japanese Patent Application Laid-Open No. 2010-223332

PTL 2: Japanese Patent Application Laid-Open No. 2008-057452

PTL 3: Japanese Patent Application Laid-Open No. Sho 60-111094

SUMMARY OF INVENTION

Technical Problem

In the compressors described in the above-described respective patent literature, water is used for cooling and shaft sealing by utilizing the fact that the working gas is steam. Even when the shaft sealing water or the cooling water leaks to the working gas side, since it has the same gas component, it does not cause degradation of performance of the compressor, and further, processing to eliminate such mixed component from compressed gas is unnecessary. The compressor described in Patent Literature 1 is a high-speed compressor having a rotational speed of 10000 revolutions/minute. As its discharge pressure is high, the mechanical seal is arranged in three stages, so as to prevent leakage of steam as working gas to the outside of the device. Since the working gas is high-pressure gas, it is necessary to prepare high-pressure sealing water to be used in the mechanical seal in accordance with the working gas.

In this manner, high-pressure gas or high-pressure liquid is required in the sealing water system. When the sealing water is to be circulated, the entire piping system must be a system having pressure higher than atmospheric pressure. The pressure of this circulation system depends on the pressure of the working gas. However, as the suction pressure of the compressor is high, it is necessary to maintain high inner pressure in the sealing water circulation system. Since a vapor compressor is used in an electric power plant or the like, it has an extensive piping system. A piping system having high inner pressure is expensive and reduction of the system is required. Further, when a high-pressure piping system is used, maintenance work is increased, and the number of work steps and daily checking work are also increased.

In Patent Literature 2, a vapor compressor used in a heat pump system is described. Steam compressed with the compressor is used as purge gas, and the purge gas is exhausted with a vacuum pump. Accordingly, as the required pressure in the shaft seal member is pressure via the intervened atmospheric pressure, even when the purge gas is used in a circulation system, only a low-pressure piping system is required. That is, the usage of the vapor compressor used in a heat pump system is different from that of the high-pressure steam compressor used in an electric power plant or the like, and the high-pressure piping system is unnecessary. In Patent Literature 3, although the use of the compressor in the heat pump system is described, the discharge of sealing water is not considered.

The present invention has been made in view of the above-described conventional techniques, and its object is to, in a centrifugal steam compressor having a sealing water discharge at pressure higher than atmospheric pressure and its shaft seal system, realize a simple structure in which a high-pressure piping system is omitted as much as possible from a sealing water circulation system. Further, the invention has another object to construct a sealing water circulation system at a low cost and to improve assemblability and maintainability.

Solution to Problem

The characteristic feature of the present invention to attain the above-described object is a centrifugal steam compressor having a shaft seal system to supply sealing water to a centrifugal compressor which rotate-drives an impeller attached to a rotary shaft to compress gas including steam, including: radial bearings that rotate-support the rotary shaft at its both ends; a thrust bearing that supports a thrust force generated in the rotary shaft; and two seal means provided between the respective radial bearings and the impeller, wherein the respective seal means have a mechanical seal provided in three stages in an axial direction, and a common primary sealing water chamber to supply the sealing water to first-stage and second-stage mechanical seals positioned on the impeller side, and a secondary sealing water chamber to supply the sealing water to a third-stage mechanical seal positioned on the device-outermost side, are provided, wherein the primary sealing water chamber is supplied with high-pressure sealing water via a first pressure regulating valve, and the secondary sealing water chamber is supplied with low-pressure sealing water via a second pressure regulating valve, and wherein a circulating water reservoir that stores circulating water, a positive displacement pump that sucks the circulating water from the circulating water reservoir, and is capable of supplying the sealing water, at pressure higher than the sealing water supplied to the primary sealing water chamber, to the first and second pressure regulating valves, an accumulator provided between the positive displacement pump and the first and second pressure regulating valves, a return piping that returns the sealing water, which water-seals the respective stage mechanical seals and returns from the primary sealing water chamber and the secondary sealing water chamber, to the circulating water reservoir, and depressurization means interpositioned in the middle of the return piping, are provided.

In this characteristic feature, it is preferable that the depressurization means is an orifice provided in the return piping and provided in the vicinity of the compressor, and it is preferable that a pressure difference which acts on a seal chamber of the respective stage mechanical seals is 3 to 5.5 MPa, and a PV value of a seal surface is equal to or less than 270 (MPa·m/s).

Another characteristic feature of the present invention to attain the above-described object is a shaft seal system, provided in a centrifugal compressor to compress gas including steam, capable of supplying high-pressure sealing water and low-pressure sealing water, wherein a circulating water reservoir that stores circulating water, a positive displacement pump that sucks the circulating water from the reservoir and is capable of supplying the sealing water to a first pressure regulating valve provided in a high-pressure side sealing water line of the centrifugal compressor and a second pressure regulating valve provided in a low-pressure side sealing water line of the centrifugal compressor, an accumulator provided between the positive displacement pump and the first and second pressure regulating valves, a return piping that returns the sealing water, which water-seals seal means of the centrifugal compressor, to the circulating water reservoir, and depressurization means interpositioned in the middle of the return piping, are provided.

In this characteristic feature, the accumulator is formed with a pressure container, gaseous body and filling water contained in it, and a valve to regulate a flow. When the pressure of the sealing water is high, the gaseous body contained in the container is compressed and the filling water is held in the container. When the pressure of the sealing water is low, the contained gaseous body is expanded to press the filling water out. With this arrangement, the accumulator reduces pressure pulsation, and further, when the power is lost and the compressor is in coast down mode, supplies the sealing water to the primary seal chamber.

Advantageous Effects of Invention

According to the present invention, since the sealing water discharged at high pressure is depressurized to atmospheric pressure in the vicinity of the shaft seal member of the compressor and re-pressurized with the positive displacement pump then is supplied, it is possible to maintain the atmosphere in the sealing water reservoir, and it is possible to realize a simple structure where the high-pressure piping system is omitted as much as possible from the sealing water circulation system. Further, since the high-pressure piping system is hardly required on the exhaust side, the sealing water circulation system becomes a low-cost system, and it is possible to improve assemblability and omit daily maintenance work.

DESCRIPTION OF EMBODIMENTS

Figure 1:
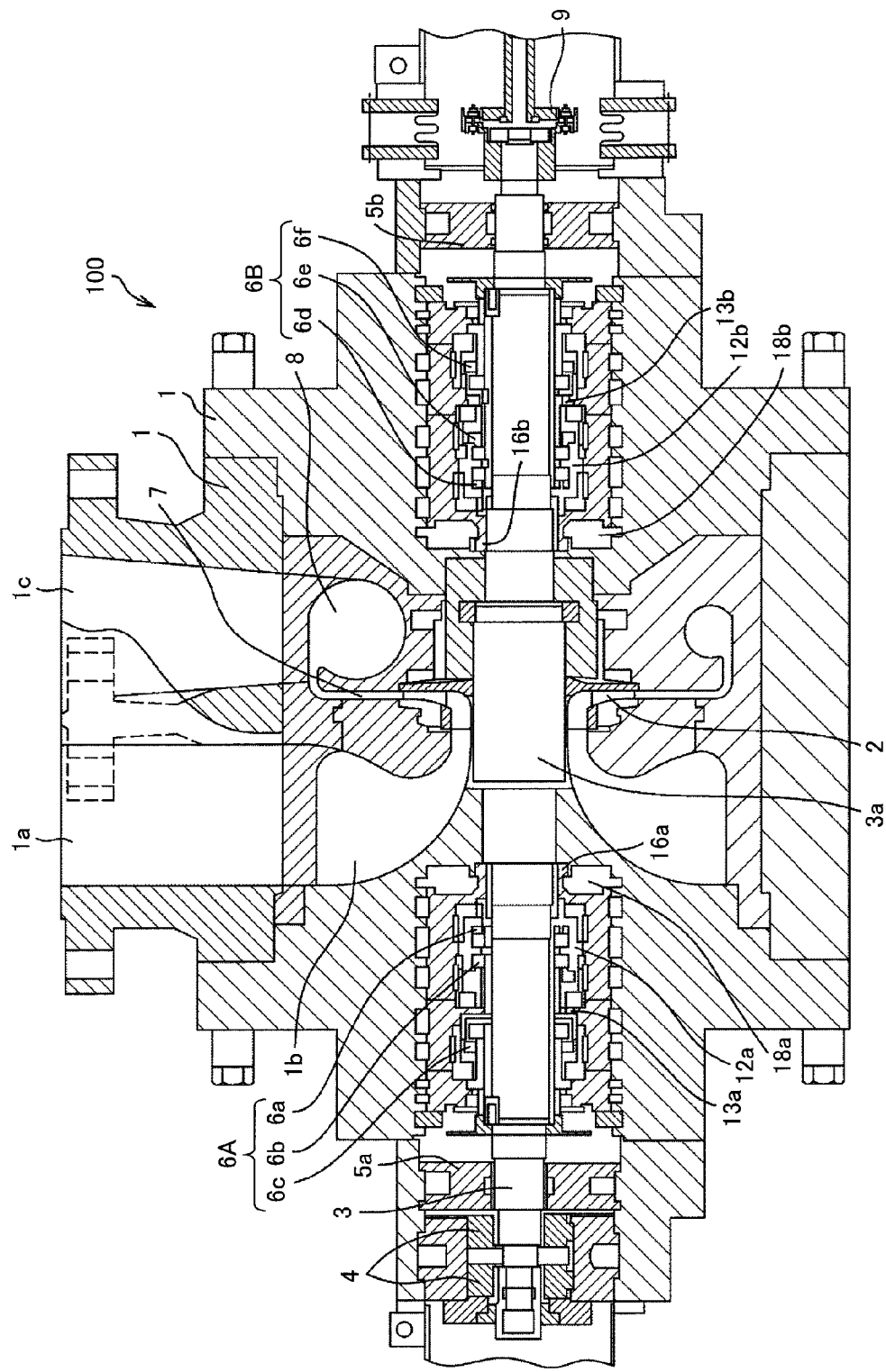
FIG. 1 is a longitudinal cross-sectional diagram of an example of a centrifugal steam compressor according to the present invention.

Hereinbelow, an example of a single-stage centrifugal superheated steam compressor and a shaft seal system used with the compressor according to the present invention will be described using the drawings. FIG. 1 shows an example of a centrifugal compressor 100 according to the present invention, in a longitudinal cross-sectional diagram. Although the details will be described later, in the centrifugal compressor 100, an impeller 2 is attached to a rotary shaft 3, and rotate-driven with a prime mover such as an electric motor (not shown) connected via a coupling 9.

The centrifugal compressor 100 which is a center impeller type compressor is rotatably supported with radial bearings 5a and 5b provided on both end sides of the rotary shaft 3. Further, a thrust bearing 4 is provided on one end side of the rotary shaft 3, and on the left end side in FIG. 1, and it supports a thrust force generated with rotation of the rotary shaft 3. These radial bearings 5a and 5b and the thrust bearing 4 are lubricated with lubricating oil. Accordingly, to prevent leakage of the lubricating oil to the outside of the device and compression space inside of the device, seal means 6A and 6B are provided on the inner side from the two radial bearings 5a and 5b in an axial direction.

As the details will be described later, the seal means 6A and 6B respectively have a three-stage mechanical seal. That is, the seal means 6A has first-stage, second-stage and third-stage mechanical seals 6a to 6b; and the seal means 6B, first-stage, second-stage and third-stage mechanical seals 6d to 6f. Since sealing water is required in these seal means 6A and 6B, in the present example, to prevent interfusion of foreign materials into the seal means 6A and 6B, circulating water is utilized.

The sealing water in the seal means 6A and 6B is stored in a circulating water reservoir 240. A positive displacement pump 200 connected to the circulating water reservoir 240 with a water supply line 360 pressurizes circulating water 80 almost at atmospheric pressure to high pressure of about 9.8 MPaG. A part of the high-pressure circulating water 80 is stored in an accumulator 210 via a valve 211.

Since the positive displacement pump 200 is used, pressure pulsation occurs. To reduce the pressure pulsation, the accumulator 210 is provided on the discharge side of the positive displacement pump 200 so as to reduce the pulsation of the discharged sealing water 80 and to supply stabled sealing water to the seal means 6A and 6B.

The circulating water 80, which has been temperature-increased with the positive displacement pump 200 and is at high pressure, is cooled by heat exchange with the cooling water in a cooler 220 and is introduced to a filter 230. A cooling water piping (supply pipe) 223 and a cooling water piping (return) 224 are connected to the cooler 220 respectively via valves 221 and 222.

The circulating water 80, filtered with the filter 230, except an amount required in the seal means 6A and 6B, is returned via a bypass line 320 to the circulating water reservoir 240. Note that the circulating water reservoir 240 is in a status at atmospheric pressure, and the pressure of the circulating water 80 passed through the bypass line 320 is about the above-described 9.8 MPaG. It is necessary to depressurize the circulating water passed through the bypass line 320. Accordingly, the bypass line 320 includes a pressure regulating valve 250. A reservoir return pressure regulating line 251 is connected to the pressure regulating valve 250, to reduce the pressure of the bypass line 320 to predetermined pressure.

To supply the sealing water 80 to the seal means 6A and 6B, the circulating water supply line branches into a secondary seal water supply main line 310 and a primary seal water supply main line 330. The primary seal water supply line 330 is a line to supply the sealing water 80 to the first-stage mechanical seals 6a and 6d and the second-stage mechanical seals 6b and 6e provided on the device-inner side among the seal means 6A and 6B, and branches into a primary sealing water chamber supply line 331 on the seal means 6A side and a primary sealing water chamber supply line 332 on the seal means 6B side. Similarly, the secondary seal water supply main line 310 is a line to supply the sealing water 80 to the third-stage mechanical seals 6c and 6f provided on the device-outer side among the seal means 6A and 6B, and branches into a secondary sealing water chamber supply line 311 on the seal means 6A side and a secondary sealing water chamber supply line 312 on the seal means 6B side.

Note that primary seal water supply main line 330 is provided with a pressure regulating valve 290 via a check valve 280. A primary sealing water pressure regulating line 301 is connected to the pressure regulating valve 290, to perform control so as to maintain the pressure in the primary sealing water chamber to be described later higher than that in the secondary sealing water chamber. The secondary seal water supply main line 310 is also provided with a pressure regulating valve 300, and a secondary sealing water pressure regulating line 302 is connected to the pressure regulating valve 300. The pressure regulating valve 300 is controlled with the secondary sealing water pressure regulating line 302 to maintain pressure higher than atmospheric pressure. In this manner, it is necessary to maintain the pressure of the secondary seal water supply main line as the high pressure side at about 7.7 MPaG. This is the reason why the positive displacement pump 200 capable of supplying high pressure water is employed.

An accumulator 270 is provided via a valve 272 in a piping branched from the downstream side from the position of the check valve 280 of the primary seal water supply main line and the upstream side from the pressure regulating valve 290. The accumulator 270 is provided to, upon loss of power, supply the sealing water 80 to the primary sealing water chamber, to wholesomely maintain the seal means 6A and 6B until the compressor 100 stops. The check valve 280 prevents solid contact between the stationary ring and the securing ring of the mechanical seals 6a to 6f by leakage of the sealing water from the side of the seal means 6A and 6B to the positive displacement pump 200 side upon loss of power or the like.

The sealing water 80 which has cooled the mechanical seals 6a to 6f in the respective stages is returned, through primary sealing water chamber return lines 335 and 336 and secondary sealing water chamber return lines 315 and 316, connected to the respective sealing water chambers, and a sealing water return line 340 collecting them, to the circulating water reservoir 240. Note that orifices 313, 314, 333 and 334 as depressurization means are provided in the middle of the primary sealing water chamber return lines 335 and 336 and the secondary sealing water chamber return lines 315 and 316, and the pressure of the sealing water 80 is depressurized to around the atmospheric pressure as stored pressure in the circulating water reservoir 240.

That is, as the orifices 313, 314, 333 and 334 are provided in the vicinity of the compressor 100, it is possible to use the line of return flow, out of the orifice depressurized to around the atmospheric pressure on the exit side of the orifices 313, 314, 333 and 334, as so-called low-pressure piping, and it is unnecessary to provide high-pressure piping in consideration of pressure resistance. With this arrangement, the tolerance of the layout of the compressor 100 is increased, and assembly and work related to the piping can be facilitated. Further, it is possible to reduce the costs of the piping itself and the costs of the circulating water reservoir.

Note that before the sealing water 80 leaked from the seal means 6A and 6B to the outside of the device flows in the radial bearings 5a and 5b, it is returned to the circulating water reservoir 240 from the sealing water drain return line 340 and sealing water drain line 354. Note that to check the leaked sealing water 80, sight glasses (SGs) 351 and 352 are provided in the sealing water drain return line 340 and the sealing water drain line 354 in positions in the vicinity of the compressor 100. Note that since separator gas is infused from an oil slinger labyrinth between the sealing water drain and the radial bearing, there is no fear of infiltration of oil in the sealing water drain.

Figure 2:
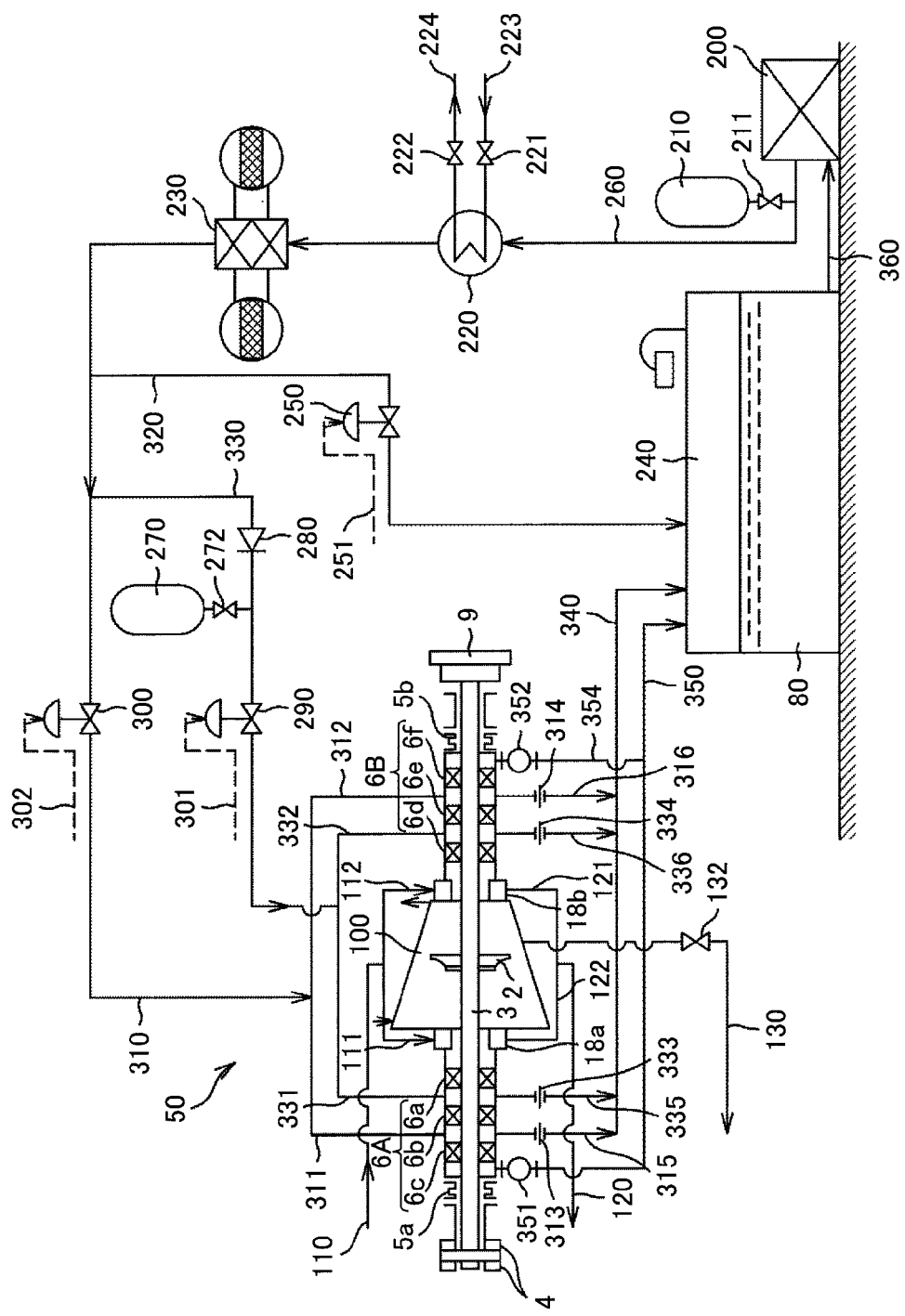
FIG. 2 is a system diagram of a sealing water system having the centrifugal steam compressor.

The centrifugal compressor 100 to use high-temperature and high-pressure superheated steam as working gas will be described using FIG. 1 and FIG. 2. In the centrifugal compressor 100, one centrifugal impeller 2 is attached to the rotary shaft 3. The rotary shaft 3 and the centrifugal impeller 2 integrally form a rotor 3a. The rotor 3a is supported rotatably in a radial direction with the radial bearings 5a and 5b provided at both ends of the rotary shaft 3. Further, in the figures, it is supported in the axial direction with the thrust bearing 4 provided on the left end side. A casing 1 airtightly accommodating the rotor 4 and the bearings 5 is provided.

The seal means 6A and 6B to prevent leakage of superheated steam circulating inside the centrifugal compressor 100 to the side of the bearings 5a and 5b are provided on the device-inner side as the further inner side in the axial direction from the radial bearings 5a and 5b. The casing 1 covers the seal means 6A and 6B and the bearings 5a and 5b, and extends, over the centrifugal impeller 2, to the end of the rotary shaft 3. With this arrangement, the leakage of steam to the outside of the device is prevented.

The superheated steam circulating in the centrifugal compressor 100 is sucked from a suction nozzle 1a formed in the casing 1 to the radial-direction inner side, in accordance with the rotation of the rotor 4, to change the flow direction immediately before the centrifugal impeller 2 to the axial direction with a suction flow channel 1b. Then, it is introduced to the centrifugal impeller 2, pressurize-compressed in the centrifugal impeller, and its volume is reduced. The superheated steam compressed with the centrifugal impeller 2 is decelerated with a diffuser 7 and a scroll 8, its kinetic energy is converted to pressure energy and the pressure is restored. Further, it is sent as discharge gas at desired pressure from a discharge nozzle 1c formed in the casing 1 to a demander.

The seal means 6A and 6B are so-called triple mechanical seals. That is, they have three seal surfaces and two sealing water chambers. The seal means 6A has three mechanical seals, i.e., the first-stage, the second-stage and the third-stage mechanical seals 6a to 6c; and the seal means 6B, three mechanical seals, i.e., the first-stage, the second-stage, and the third-stage mechanical seals 6d to 6f. The first-stage and the second-stage mechanical seals 6a and 6b; 6d and 6e, in pairs, form a high-pressure stage seal, and the third-stage mechanical seals 6c and 6f, form a low-pressure stage seal.

To supply the sealing water 80 to the first-stage and second-stage mechanical seals 6a and 6b; and 6d and 6e forming the high-pressure stage seal, ring-shaped primary sealing water chambers 12a and 12b are formed on the outer circumferential side of the first-stage and second-stage mechanical seals 6a and 6b; and 6d and 6e. Similarly, to supply the sealing water 80 to the third-stage mechanical seals 6c and 6f forming the low-pressure stage seal, ring-shaped secondary sealing water chambers 13a and 13b are formed on the outer circumferential side of the third-stage mechanical seals 6c and 6f.

In this manner, since the triple seal structure having two high-pressure and low-pressure sealing water chambers 12a to 13b is provided, the pressure which acts on the respective mechanical seals 6a to 6f is reduced, and a PV value, represented with the product between pressure P which acts on the mechanical seal and a circumferential velocity V of the rotating ring forming the mechanical seal, is not an excessive value, and a long life is expected.

Now, since the sealing water in the mechanical seal is water contained in the working fluid of the compressor and since vapor does not leak from the mechanical seal, no particular system to replenish steam or discharge leaked water is necessary. However, since the working fluid is superheated steam and is high pressure fluid, in the case of single-type or double-type mechanical seal, the PV value as an index of the load on the mechanical seal is too high, it is not applicable without difficulty. When these mechanical seals are used, there is fear that a seal slide member formed between the stationary ring and the rotating ring is broken.

Figure 3:
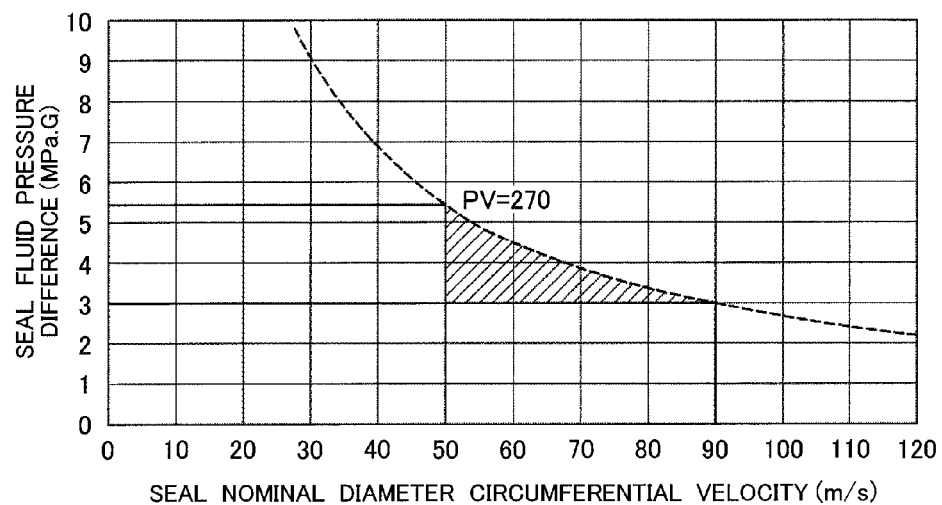
FIG. 3 is a diagram explaining the performance of a mechanical seal.
Figure 4:
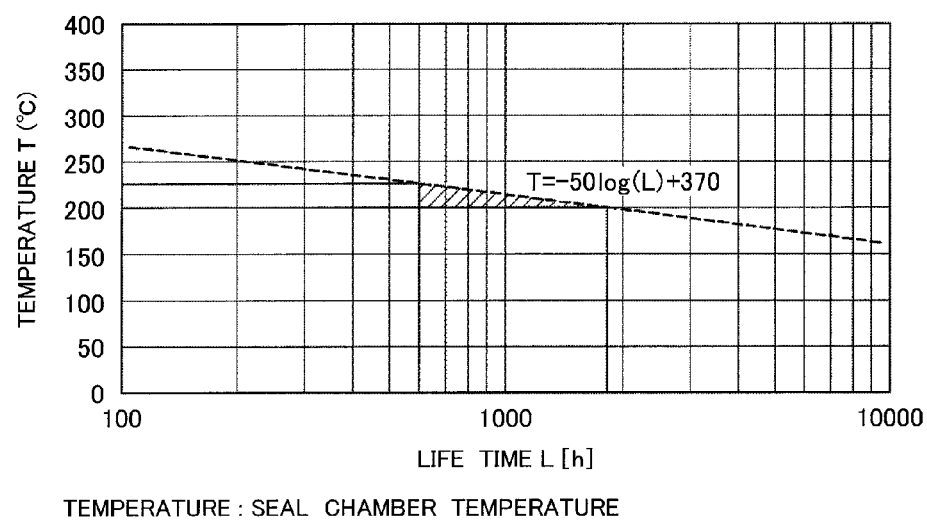
FIG. 4 is a diagram explaining the life of the mechanical seal.

FIG. 3 and FIG. 4 show the operating characteristics of the mechanical seal. FIG. 3 shows the relation between pressure (pressure difference) (MPa) applied on the seal member of the mechanical seal and the circumferential velocity (m/s) of the rotating ring of the mechanical seal. In the figure, a hatched portion is an available range even at a high circumferential velocity. Assuming that the upper limit of the PV value is 270 (MPa·m/s), on the condition that V≥50 m/s holds as the circumferential velocity V of the rotating ring of the mechanical seal, the allowable pressure difference range is 3 to 5.5 MPa.

On the other hand, a figure indicating the seal chamber temperature as a vertical axis, and the life time of the mechanical seal at that time as a lateral axis, is FIG. 4. High-temperature steam gas flows in the seal surface of the mechanical seal to seal superheated steam. Accordingly, when the life time is obtained on the condition that the seal chamber temperature is equal to or higher than 200° C., the maximum life of the mechanical seal is about 1800 hours. On the other hand, when the allowable maximum temperature of the seal chamber is 230° C., the life of the mechanical seal is 600 hours. That is, when the seal chamber temperature merely rises to about 230° C., the mechanical seal has life of 600 hours or longer. Then, based on the detected device inner pressure of the compressor 100, the pressure of the sealing water supplied to the respective seal chambers is regulated with respective pressure regulating valves 290 and 300 such that the pressure difference in each seal becomes predetermined pressure, to ensure the life of the mechanical seal of 600 or more hours.

As described above, in the present example, as shaft sealing of the vapor compressor using superheated steam as working gas, the seal means 6A and 6B having three seal surfaces are used, and two high and low sealing water chambers are provided. Accordingly, it is possible to reduce the pressure which acts on the respective mechanical seals 6a to 6f. Further, since it is the sealing water 80 that leaks from the mechanical seals 6a to 6f, steam in a test facility system does not leak, and replenishment of steam is unnecessary.

Further, since the sealing water 80 circulates with respect to the circulating water reservoir 240, the heat generated in the radial bearings 5a and 5b adjacently provided in the seal means 6A and 6B is heat-transmitted via the rotary shaft 3 or the like to the seal means 6A and 6B, and the heat is removed with the sealing water 80. Accordingly, it is expected that the temperature rise in the radial bearings 5a and 5b is suppressed.

Floating seals 16a and 16b, having an O ring or the like, are provided on the device-inner side from the seal means 6A and 6B and inside of the casing 1. To cool the floating seals 16a and 16b, water jackets 18a and 18b are formed between the floating seals 16a and 16b and the seal means 6A and 6B. The water jackets 18a and 18b are supplied with cooling water different from the sealing water 80, since the pressure and water temperature, water quality management of the cooling water are different from use conditions of the sealing water. With this arrangement, the control with the sealing water is facilitated.

Further, according to the present example, the positive displacement pump is used as a driving source of the sealing water circulation system, and the accumulator is provided in the vicinity of the positive displacement pump. Accordingly, high-pressure sealing water, having small pulsation, against the pressure of the superheated steam as the working gas, can be supplied. Further, since it is possible to set the respective seal surfaces of the triple mechanical seal to or lower than predetermined pressure, it is possible to conduct operation with the PV value, which is a predetermined or lower value, as an index of the life of the mechanical seal, and to prolong the life of the mechanical seal.

REFERENCE SIGNS LIST

1 . . . casing, 1a . . . suction nozzle, 1b . . . suction flow channel, 1c . . . discharge nozzle, 2 . . . centrifugal impeller, 3 . . . rotary shaft, 4 . . . thrust bearing, 5a, 5b . . . radial bearing, 6A, 6B . . . seal means, 6a . . . third-stage mechanical seal, 6b . . . second-stage mechanical seal, 6c . . . first-stage mechanical seal, 6d . . . first-stage mechanical seal, 6e . . . second-stage mechanical seal, 6f . . . third-stage mechanical seal, 7 . . . diffuser, 8 . . . scroll, 9 . . . coupling, 12a, 12b . . . primary sealing water chamber, 13a, 13b . . . secondary sealing water chamber, 16a, 16b . . . floating seal (O ring), 18a, 18b . . . water jacket, 50 . . . shaft seal system, 80 . . . circulating water (sealing water), 100 . . . centrifugal compressor, 110 . . . jacket cooling water supply main line, 111, 112 . . . jacket cooling water supply line, 120 . . . jacket cooling water return main line, 121, 122 . . . jacket cooling water return line, 130 . . . in-device drain line, 132 . . . drain open valve, 200 . . . positive displacement pump, 210 . . . accumulator, 211 . . . valve, 220 . . . cooler, 221, 222 . . . valve, 223, 224 . . . cooling water piping, 230 . . . filter, 240 . . . circulating water reservoir, 250 . . . pressure regulating valve, 251 . . . reservoir return pressure regulating line, 260 . . . circulating water supply line, 270 . . . accumulator, 272 . . . valve, 280 . . . check valve, 290, 300 . . . pressure regulating valve, 301 . . . primary sealing water pressure regulating line, 302 . . . secondary sealing water pressure regulating line, 310 . . . secondary sealing water chamber supply main line, 311, 312 . . . secondary sealing water chamber supply line, 313, 314 . . . depressurization means (orifice), 315, 316 . . . secondary sealing water chamber return line, 320 . . . bypass line, 330 . . . primary sealing water chamber supply main line, 331, 332 . . . primary sealing water chamber supply line, 333, 334 . . . depressurization means (orifice), 335, 336 . . . primary sealing water chamber return line, 340 . . . sealing water return line, 350 . . . sealing water drain return line, 351, 352 . . . sight glass (view port), 354 . . . sealing water drain line, 360 . . . water supply line.

The invention claimed is:

1. A centrifugal steam compressor having a shaft seal system to supply sealing water to a centrifugal compressor which rotate-drives an impeller attached to a rotary shaft to compress gas including steam, comprising:

radial bearings that rotate-support the rotary shaft at its both ends; a thrust bearing that supports a thrust force generated in the rotary shaft; and two seal means provided between the respective radial bearings and the impeller, wherein the respective seal means have a mechanical seal provided in three stages in an axial direction, and a common primary sealing water chamber to supply the sealing water to first-stage and second-stage mechanical seals positioned on the impeller side, and a secondary sealing water chamber to supply the sealing water to a third-stage mechanical seal positioned on the device-outermost side, are provided, wherein the primary sealing water chamber is supplied with high-pressure sealing water via a first pressure regulating valve, and the secondary sealing water chamber is supplied with low-pressure sealing water via a second pressure regulating valve, and wherein a circulating water reservoir that stores circulating water, a positive displacement pump that sucks the circulating water from the circulating water reservoir, and is capable of supplying the sealing water, at pressure higher than the sealing water supplied to the primary sealing water chamber, to the first and second pressure regulating valves, an accumulator provided between the positive displacement pump and the first and second pressure regulating valves, a return piping that returns the sealing water, which water-seals the respective stage mechanical seals and returns from the primary sealing water chamber and the secondary sealing water chamber, to the circulating water reservoir, and depressurization means interpositioned in the middle of the return piping, are provided.

2. The centrifugal steam compressor according to claim 1, wherein the depressurization means is an orifice provided in the return piping and provided in the vicinity of the compressor.

3. The centrifugal steam compressor according to claim 1, wherein a pressure difference which acts on a seal chamber of the respective stage mechanical seals is 3 to 5.5 MPa, and a PV value of a seal surface is equal to or less than 270 (MPa m/s).

4. A shaft seal system, provided in a centrifugal compressor to compress gas including steam, capable of supplying high-pressure sealing water and low-pressure sealing water, wherein a circulating water reservoir that stores circulating water, a positive displacement pump that sucks the circulating water from the reservoir and is capable of supplying the sealing water to a first pressure regulating valve provided in a high-pressure side sealing water line of the centrifugal compressor and a second pressure regulating valve provided in a low-pressure side sealing water line of the centrifugal compressor, an accumulator provided between the positive displacement pump and the first and second pressure regulating valves, a return piping that returns the sealing water, which water-seals seal means of the centrifugal compressor, to the circulating water reservoir, and depressurization means interpositioned in the middle of the return piping, are provided.

5. The shaft seal system according to claim 4, wherein, in addition to the accumulator, another accumulator that supplies the sealing water to the primary seal chamber upon loss of power is provided.

6. The centrifugal steam compressor according to claim 2, wherein a pressure difference which acts on a seal chamber of the respective stage mechanical seals is 3 to 5.5 MPa, and a PV value of a seal surface is equal to or less than 270 (MPa m/s).

* * * * *